United States Patent
Placek

[15] 3,705,594
[45] Dec. 12, 1972

[54] SAFETY SHUTOFF VALVE STRUCTURE AND METHOD

[72] Inventor: Donald D. Placek, University Heights, Ohio

[73] Assignee: The North American Manufacturing Company, Cleveland, Ohio

[22] Filed: July 1, 1971

[21] Appl. No.: 158,720

[52] U.S. Cl. ........................................ 137/1, 251/69
[51] Int. Cl. ................................................ F16k 31/44
[58] Field of Search ............. 251/66, 68, 69; 137/1

[56] References Cited

UNITED STATES PATENTS

| | | | |
|---|---|---|---|
| 3,504,684 | 4/1970 | Ziccardi | 137/1 |
| 3,552,713 | 1/1971 | Kleeberg | 251/69 |

*Primary Examiner*—Henry T. Klinksiek
*Attorney*—L. Gaylord Hulbert et al.

[57] ABSTRACT

Safety shutoff valve structure and method, wherein the valve is a ball valve sealed by an annular flexible seal urged into engagement with the valve by a garter spring whereby on opening the valve substantially no pressure drop is developed across the valve, and wherein a compression spring is provided for urging the valve stem in one direction to close the valve, a lever and detent means therefor are connected to the valve stem by a solenoid actuated spring clutch responsive to a predetermined condition whereby on rotating the valve stem to place the valve in an open position, the valve is maintained in the open position until occurrence of the predetermined condition. The spring clutch is operated with a uniform force not dependent on the valve opening torque or compression spring strength and the spring clutch is engaged with a force greater than the actuating force on moving the valve to an open position.

10 Claims, 5 Drawing Figures

PATENTED DEC 12 1972

INVENTOR
DONALD D. PLACEK
BY Whittemore
Hulbert & Belknap
ATTORNEYS

INVENTOR
DONALD D. PLACEK

INVENTOR
DONALD D. PLACEK

SAFETY SHUTOFF VALVE STRUCTURE AND METHOD

BACKGROUND OF THE INVENTION

1. Field of the Invention

The invention relates to valves in gas lines or the like and refers more specifically to a ball-type safety shutoff valve which offers substantially no resistance to gas flow in the open position thereof which is held open by a spring biased detent through a solenoid actuated spring clutch prior to the occurrence of a predetermined condition and which is automatically closed on disengagement of the spring clutch on the occurrence of the predetermined condition by means of a compression spring urging the valve closed.

2. Description of the Prior Art

In the past, safety shutoff valves have been spool valves, check valves, and the like, which offer resistance to gas flow therethrough even in the open position thereof. The placing of such valves in a gas line has therefore in the past been undesirable and produced either lower pressure at the utilizing device or required greater initial gas pressure.

In addition, with prior safety shutoff valves wherein solenoids have been used therewith, the solenoid has usually been required to resist the compression spring urging the valve closed as well as the valve opening torque during opening of the valve. This is undesirable since these forces are variable and require an excessively large solenoid. Also, with such structure the opening of the valve tends to reduce the ultimate force holding the valve open rather than increase it.

SUMMARY OF THE INVENTION

In accordance with the invention, a safety shutoff valve is provided including a ball-type valve having a central opening therethrough with approximately the same diameter as the diameter of a gas pipe in which the valve is installed whereby on opening of the valve substantially no resistance to passage of gas through the pipe is caused. The ball valve is sealed by means of an annular flexible seal urged into sealing engagement with the ball valve by means of a garter spring.

The ball valve includes a stem, which stem is connected to a shaft by means of a spring clutch responsive to a predetermined condition such as the electrical energy in a circuit. A compression spring is provided between the spring clutch and valve acting on the valve stem to urge the valve into a closed position, and means are secured to the shaft to rotate the valve into an open position with the spring clutch energized and to hold the valve in the open position until release of the spring clutch at which time the compression spring will cause the ball valve to return to its normally closed position.

The spring clutch, in accordance with the invention, need be actuated by a small constant force since the force need not oppose the opening torque of the valve or the force of the compression spring tending to urge the valve into a closed position. Further, in accordance with the invention, the opening of the valve tends to engage the spring clutch with more force rather than detract from the clutch actuating force.

DESCRIPTION OF THE PREFERRED EMBODIMENT

Figure 2:
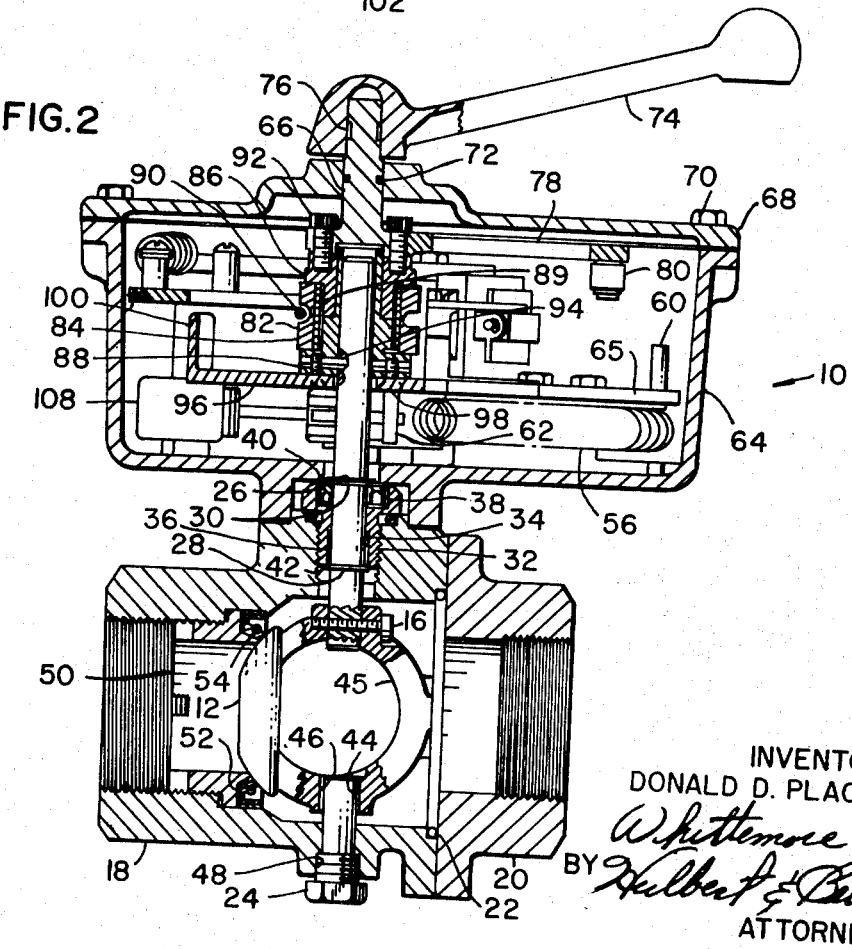
FIG. 2 is a section view of the valve structure illustrated in FIG. 1 taken substantially on the line 2—2 in FIG. 1.

As shown best in FIG. 2, the valve structure 10 includes a ball valve 12 having a valve stem 14 connected thereto by convenient means such as bolt 16. The valve 12 is rotatably mounted in the gas pipe coupling 18 on the dead-end shaft 24. Coupling 18 may be connected to the gas pipe coupling 20 with an O-ring seal 22 therebetween. The valve 12 is maintained in position in the coupling 18 by the retaining rings 26 and 28 which secure the packing washer 30 and packing cartridge 32 therebetween.

As shown, the packing cartridge 32 includes a recess 34 in one end thereof in which the bushing 36 is retained by the retaining ring 28. An annular U-cup lubricating member 38 is secured in the recess 40 by the packing washer 30 at the other end of the packing cartridge 32. The packing cartridge 32 is screwed into the opening 42 in the coupling 18, as shown.

A bushing 44 similar to the bushing 36 is provided in the opening 46 in the ball valve 12 and as shown in FIG. 2 receives the end of the dead-end shaft 24 which is screwed in the opening 48 in the coupling 18.

A seal back-up ring 50 is threaded into the gas pipe coupling 18 and serves to support the annular flexible seal 52 in engagement with the ball valve 12, as shown in FIG. 2. The seal 52 is urged into engagement with the ball valve 12 by means of the annular garter spring 54.

The valve stem 14 is rotatably urged about its axis of generation by means of the compression spring 56 into a position in which the valve 12 is closed, as shown in FIG. 2. The compression spring 56 is positioned on a telescoping compression spring push rod assembly 58, shown best in FIG. 1. The push rod assembly 58 is secured to the pivot pin 60 at one end thereof and to the pivot pin 62 at the other end thereof. Pivot pin 62 is secured to the valve stem 14 for rotation therewith about the axis of generation thereof, as will be seen subsequently. Pivot pin 60 is secured to the case 64 in conjunction with the bracket 65, as shown.

A short shaft 66 is positioned coaxially with the valve stem 14 and as shown best in FIG. 2 is mounted for rotation in the case cover 68 which is secured to the case 64 by convenient means such as bolts 70. The O-ring seal 72 is provided between the case cover 68 which is secured to the case 64 by convenient means such as bolts 70. The O-ring seal 72 is provided between the case cover 68 and shaft 66. The reset handle 74 is connected to one end of the shaft 66 by convenient means such as keys 76, as shown.

A latching lever 78 having a reset latch roller 80 on one end thereof is integral with or secured to the other end of the shaft 66 for rotation therewith about the axis of rotation of the shaft 66.

Figure 4:
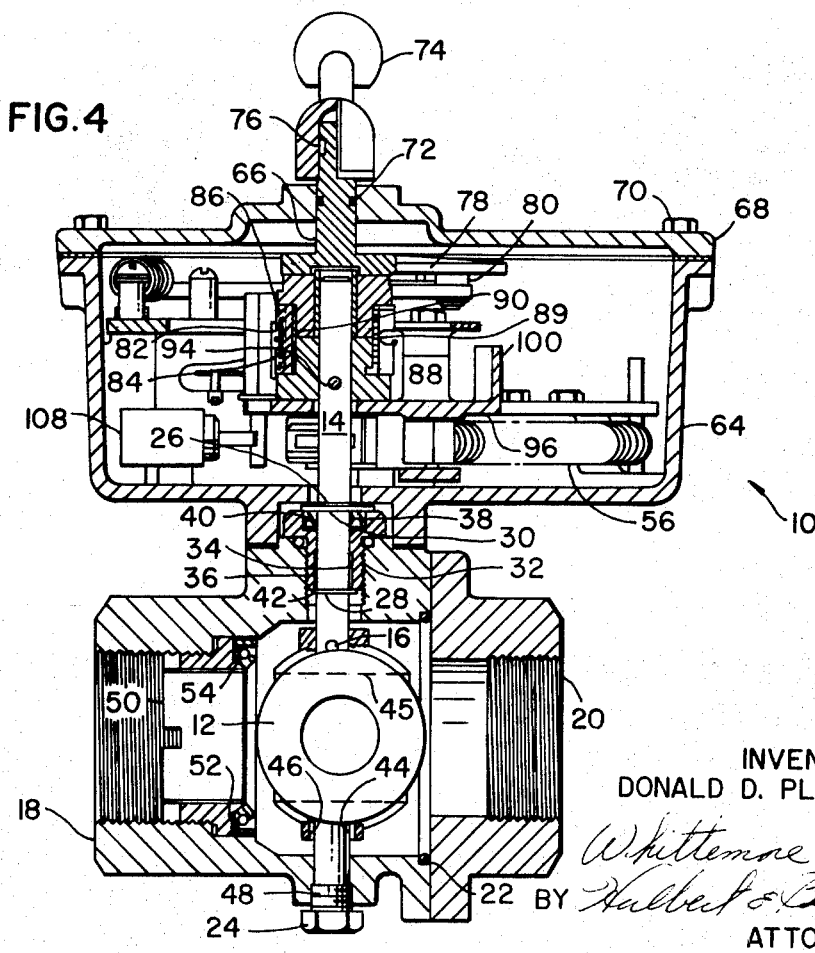
FIG. 4 is a cross section of the valve structure illustrated in FIG. 3, taken substantially on the line 4—4 in FIG. 3.

A spring clutch 82 including the clutch collar 84, clutch input hub 86, clutch output hub 88, clutch spring 89 and the clutch actuating spring 90, is connected between the valve stem 14 and shaft 66, as shown best in FIGS. 2 and 4. The clutch input hub 86 is secured to the shaft 66 by convenient means such as the bolts 92, while the clutch output hub 88 is secured to the valve stem 14 by the transverse pin 94. The clutch output hub 88 is further connected to the plate 96 by convenient means such as the screw 98.

The plate 96 mounts the previously referred to pin 62 carrying one end of the push rod 58 for the spring 56. In addition, the plate 96 has a position indicator portion 100 thereon operable in conjunction with the window 102 in the case 64 to provide an indication of whether the valve 12 is open or shut, depending upon the rotative position of the plate 96 with the valve stem 14.

The bumper 104 carried by the plate 96 is operable in conjunction with the stop 106 carried by the case 64 to limit the clockwise rotative position of the plate 96 with the valve stem 14 under urging of the compression spring 56. In such position, the plate 96 or a projection therefrom may actuate the limit switch 108 through conductors 110. Limit switch 108 may be used to provide an audible or visible indication of closing of the valve 12 or may be used to provide other signals desired on closing of the valve 12.

Figure 1:
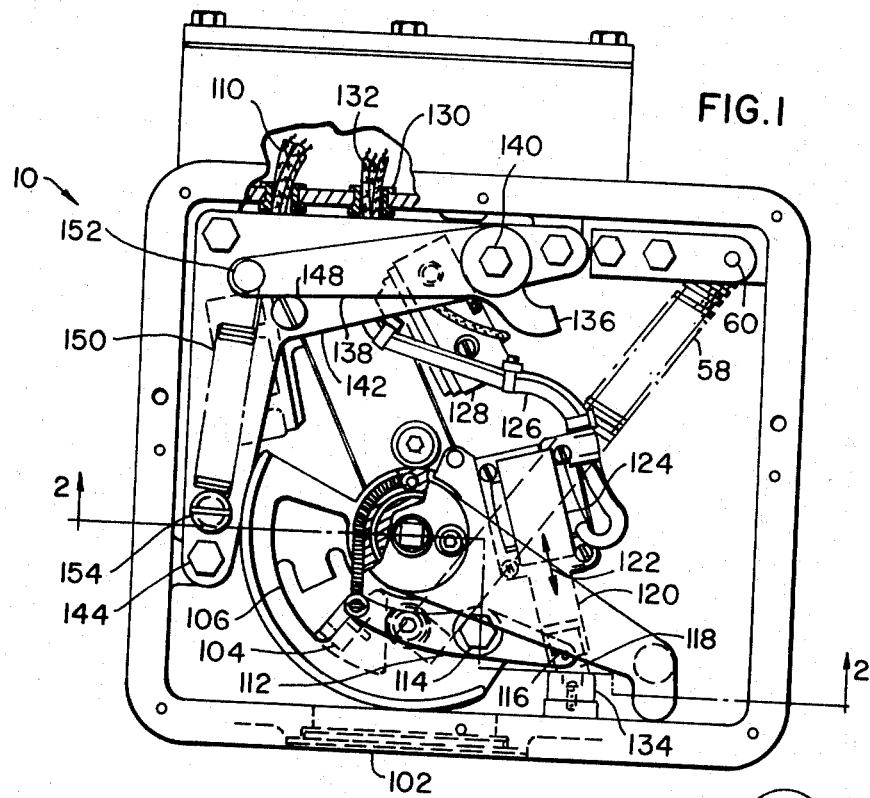
FIG. 1 is a plan view of the safety shutoff valve structure of the invention with the cover and reset handle removed therefrom and with the valve in a closed position.
Figure 3:
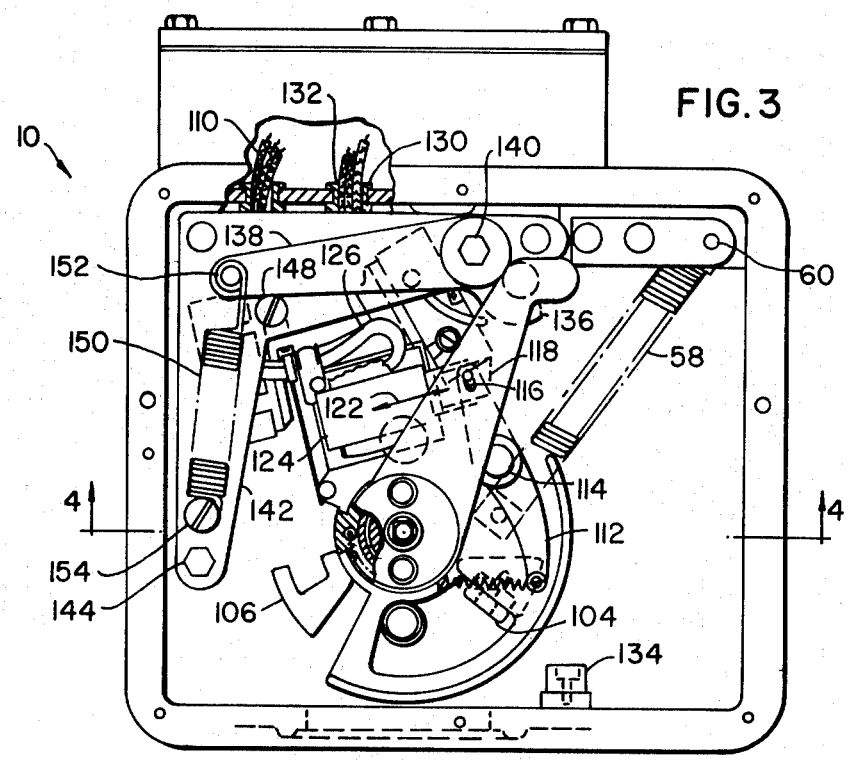
FIG. 3 is a plan view of the valve structure illustrated in FIG. 1 with the valve in an open position.

The clutch engagement spring 90 is secured at one end to the clutch collar 82 and at the other end is connected to the spring lever 112. Spring lever 112, shaped as best shown in FIGS. 1 and 3, is pivotally mounted by pivot structure 114 on the plate 96. A lost motion connection 116 is provided at the end of the lever 112, not connected to the spring 90, between the lever 112 and the solenoid pivot block 118. Solenoid pivot block 118 is connected to the solenoid plunger 120 which is operable to move in the directions of arrow 122 on actuation of the solenoid 124 with energy applied to the solenoid 124 through the conductors 126 carried by the bracket 128 and extending through the grommet 130 surrounding opening 132 in case 64.

On energizing the solenoid 124, the solenoid plunger 120 is caused to move up in FIG. 1 to pivot the lever 112 counterclockwise about the pivot structure 114, thus stretching the clutch engagement spring 90 to engage the spring clutch 82. A separate recess bumper 134 is provided for the solenoid pivot block 118, as shown in FIG. 2.

With the clutch structure 82 engaged, the valve stem 14 of the valve 12 is connected to the shaft 66 for rotation therewith. On rotation of the shaft 66, the latching lever 78 is caused to rotate counterclockwise whereby the reset latch roller 80 is engaged by the end 136 of reset latch lever 138 pivotally mounted at 140 to the latch mounting plate 142, which in turn is connected to the case 64 by convenient means such as bolts 144 or the like.

The latch lever 138 is urged in a counterclockwise position against stop 148 by means of the latching spring 150 connected by pin 152 to one end of the latch lever 138 and connected at the other end by screw 154 to the latch mounting plate 142, as shown best in FIGS. 1 and 3. The spring 150 has sufficient force to prevent closing of the valve 12 by means of the compression spring 56 after opening of the valve 12 on rotation of the shaft 66 by means of the reset handle 74 and consequent movement of the reset latch roller 80 behind the end 136 of the reset latch lever 138.

Figure 5:
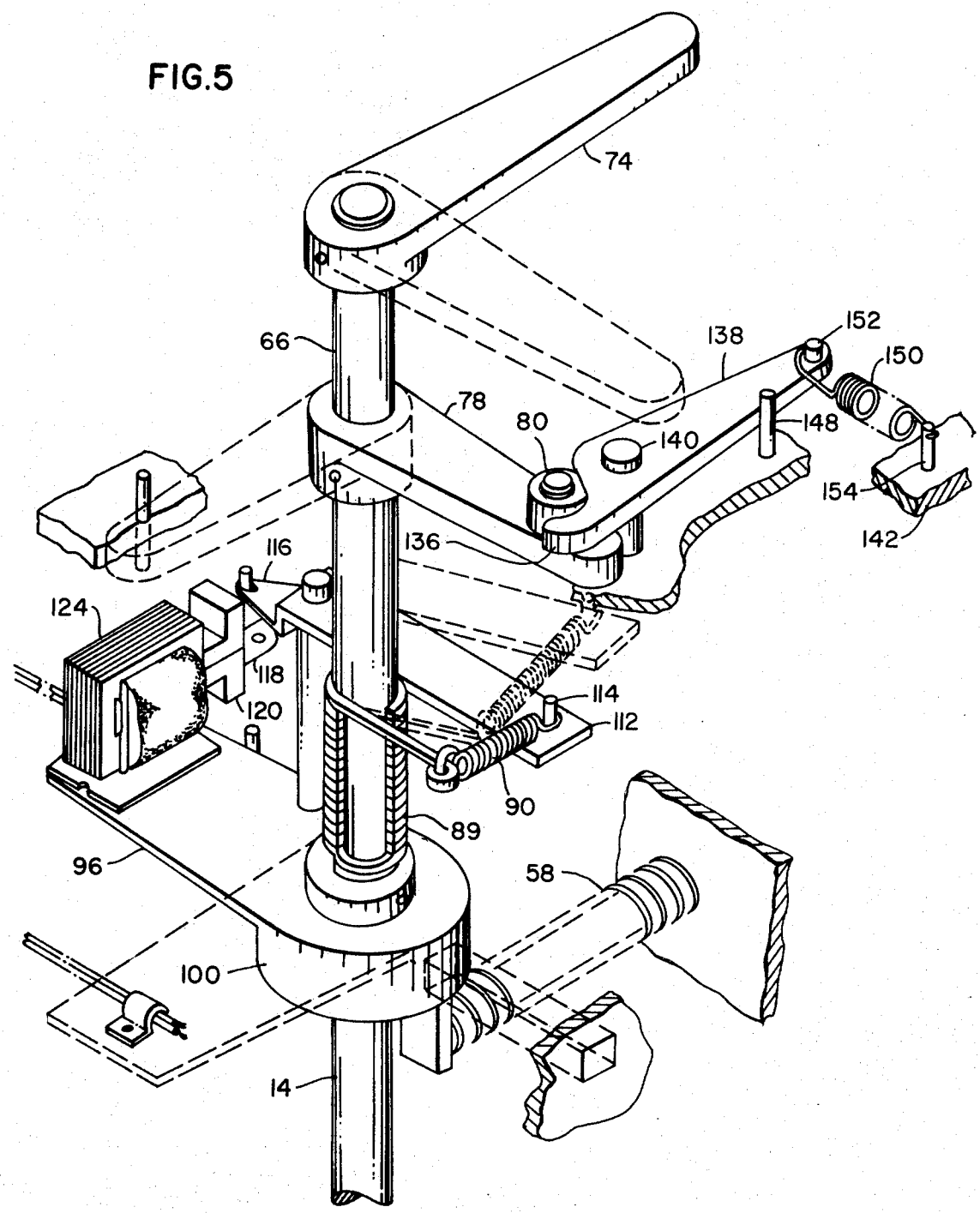
FIG. 5 is a diagrammatic representation of the safety shutoff valve structure of FIGS. 1 through 4.

In overall operation of the safety shutoff valve 10, and with particular reference to FIG. 5 as well as FIGS. 1 through 4, with the valve 12 in a closed position as shown in FIG. 2 and with the position indicator 100 indicating that the valve is shut, the solenoid 124 is energized to engage the clutch 82 whereby the coaxial shaft 66 and valve stem 14 are connected together by a relatively small force acting through lever 112 on the clutch engagement spring 90.

The reset handle 74 is then rotated counterclockwise in FIG. 5 whereby the latching lever 78 is rotated counterclockwise to position the reset latch roller 80 behind the end 136 of the reset latch 138. The valve 12 is at the same time rotated to an open position wherein the opening 45 therethrough, which is substantially the diameter of gas pipe which will be connected to the couplings 18 and 20, will permit passage of gas through the valve with substantially no resistance thereto.

The compression spring 56 is compressed at this time on the push rod 58 and the plate 96 is rotated to provide an open indication in the window 102 in the case 64.

On such rotation of the shaft 66, the clutch spring 89 will tend to be wound tighter to more securely engage the clutch structure 82. It will be particularly noted that the clutch engagement spring 90 does not have to resist either the force of the compression spring 56 or the opening torque of the valve 12 at this time.

The valve 12 will remain open until the lever 74 is moved clockwise or until the solenoid 124 is deenergized by occurrence of the predetermined condition for which closing of the valve 12 to shut off gas flow to a utilizing device is desired. On deenergizing the solenoid 124, the clutch engagement spring 90 is released as the solenoid plunger moves down in FIG. 1.

Disengagement of the clutch structure 82 will permit rotating of the plate 96 and the valve stem 14 connected thereto under the urging of the compression spring 56 to effect the desired closing of the valve 12. The plate 96 will come to rest with the bumper 104 against the abutment 106 and with the indicator indicating that the valve is shut.

To reset the safety shutoff valve structure 10, the lever 74 may be returned to its initial clockwise position on overcoming the spring 150 as by a manual force.

While one embodiment of the present invention has been considered in detail, it will be understood that other embodiments and modifications are contemplated. Thus, manual operation of the valve has been considered; however, it will be understood that the valve may be actuated electrically, pneumatically, or hydraulically. Further, it will be understood that the current interruption to the solenoid may be due to general power failure or may be caused by air or fuel pressure switches, door limit switches, flame safety relays which open a switch upon cessation of flame, or any other device used to shut off fuel when an unsafe condition is reached. It is therefore the intention to include all modifications of the invention as are defined by the appended claims within the scope of the invention.

What I claim as my invention is:

1. Safety shutoff valve structure for maintaining a normally closed valve open until the occurrence of a predetermined condition and permitting the valve to close on the occurrence of the predetermined condition comprising a valve, means connected to the valve normally biasing the valve into a closed position, means adapted to be connected to the valve for opening the valve and retaining the valve in an open position in opposition to the means for biasing the valve into a closed position and means operably connected to the means for opening the valve and retaining it in the open position for disconnecting the means for opening the valve and retaining the valve in the open position from the valve, which last mentioned means is responsive to the predetermined condition.

2. Structure as set forth in claim 1, wherein the last mentioned means is a solenoid actuated spring clutch and the predetermined condition is the breaking of an electric circuit through the solenoid.

3. Structure as set forth in claim 2, wherein the valve includes a valve stem, the means biasing the valve into a closed position includes a spring connected to the valve stem to rotate the valve stem in one direction and the means for opening the valve and retaining the valve in an open position includes a shaft coaxial with the valve stem and means for rotating the shaft in a direction to open the valve and wherein the spring clutch is operable between the valve stem and shaft.

4. Structure as set forth in claim 3, wherein the spring clutch includes an engagement spring extending peripherally around the valve stem and shaft and wherein the solenoid is operable to move the clutch engagement spring in the same direction as the valve opening means whereby the valve opening torque is operable to increase the actuating force on the spring clutch.

5. Structure as set forth in claim 4, wherein the clutch engagement spring and the solenoid are rotated with the valve stem and shaft on opening of the valve whereby the clutch actuating force on the clutch actuating spring is always the same and need not oppose the valve opening torque and valve closing means.

6. Structure as set forth in claim 1, wherein the valve is a ball valve having a central opening therethrough of substantially the same dimension as the pipe in which the valve is installed whereby on opening of the valve substantially no pressure drop is developed across the valve.

7. Structure as set forth in claim 6, wherein the ball valve is sealed with an annular flexible seal and a garter spring urging the annular flexible seal into engagement with the ball valve.

8. The method of shutting off a valve in a gas line or the like in response to a predetermined condition comprising normally urging the valve closed with a first force, opening the valve in opposition to the first force with a larger force, holding the valve in the open position and releasing the valve from the open position and larger force on occurrence of the predetermined condition whereby the valve is urged into its normally closed position by the first force.

9. The method as set forth in claim 8, wherein the valve is a ball valve having a stem thereon, the second force is applied to the valve stem through a shaft, and the valve stem and shaft are held together by a spring clutch, and further including initially actuating the spring clutch with a uniform force not dependent on the valve opening torque and second force.

10. The method as set forth in claim 8, wherein the valve is a ball valve, and further including sealing the ball valve with an annular flexible seal and holding the seal in position against the ball valve with a garter spring.

* * * * *